United States Patent
Machani et al.

(10) Patent No.: US 12,019,784 B2
(45) Date of Patent: Jun. 25, 2024

(54) PRIVACY PRESERVING EVALUATION OF SENSITIVE USER FEATURES FOR ANOMALY DETECTION

(71) Applicant: EMC IP Holding Company LLC, Hopkinton, MA (US)

(72) Inventors: Salah E. Machani, Medford, MA (US); Alex Zaslavsky, Brookline, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 119 days.

(21) Appl. No.: 16/668,705

(22) Filed: Oct. 30, 2019

(65) Prior Publication Data

US 2021/0133357 A1    May 6, 2021

(51) Int. Cl.
G06F 21/62    (2013.01)
G06F 21/32    (2013.01)
G06F 21/60    (2013.01)

(52) U.S. Cl.
CPC .......... *G06F 21/6263* (2013.01); *G06F 21/32* (2013.01); *G06F 21/602* (2013.01)

(58) Field of Classification Search
CPC ..... G06F 21/6263; G06F 21/32; G06F 21/602
See application file for complete search history.

(56) References Cited

U.S. PATENT DOCUMENTS 7,844,827 B1 * 11/2010 Itoi ....................... H04L 63/062
   713/186
9,648,034 B2 * 5/2017 Bailey ................... G06F 21/316
2002/0194003 A1 * 12/2002 Mozer ..................... G10L 17/00
   704/270.1
2005/0223236 A1 * 10/2005 Yamada .................. G06V 40/12
   713/186
2007/0036400 A1 * 2/2007 Watanabe .......... G06V 40/1376
   382/124

(Continued)

OTHER PUBLICATIONS

A. Kumar and D. Zhang, "Hand-Geometry Recognition Using Entropy-Based Discretization," in IEEE Transactions on Information Forensics and Security, vol. 2, No. 2, pp. 181-187, Jun. 2007, doi: 10.1109/TIFS.2007.896915. (Year: 2007).*

(Continued)

*Primary Examiner* — Saleh Najjar
*Assistant Examiner* — Devin E Almeida
(74) *Attorney, Agent, or Firm* — Ryan, Mason & Lewis, LLP (57) ABSTRACT

Techniques are provided for centralized processing of sensitive user data. One method comprises obtaining, by a service provider, values of predefined features based at least in part on personal information of a user, wherein the values of the predefined features are computed by the user; and processing, by the service provider, the values of the predefined features based on the personal information to detect one or more predefined anomalies associated with the user and/or a device of the user. The predefined anomalies comprise, for example, a risk anomaly, a security level anomaly, a fraud likelihood anomaly, an identity assurance anomaly, and/or a behavior anomaly. The predefined features relate to, for example, a location of the user and/or device-specific information for a device of the user.

20 Claims, 6 Drawing Sheets

(56) References Cited

U.S. PATENT DOCUMENTS

| | | | | |
|---|---|---|---|---|
| 2007/0233667 | A1* | 10/2007 | Mani | G06F 21/32 |
| | | | | 707/999.005 |
| 2007/0245154 | A1* | 10/2007 | Akkermans | G07C 9/37 |
| | | | | 713/186 |
| 2007/0286465 | A1* | 12/2007 | Takahashi | G06K 9/00087 |
| | | | | 382/125 |
| 2010/0106964 | A1* | 4/2010 | Hirata | H04L 63/0861 |
| | | | | 726/5 |
| 2010/0316261 | A1* | 12/2010 | Sugimura | G06V 10/758 |
| | | | | 382/115 |
| 2011/0099385 | A1* | 4/2011 | Takahashi | H04L 63/0861 |
| | | | | 713/186 |
| 2013/0152179 | A1* | 6/2013 | Lee | H04L 63/067 |
| | | | | 726/6 |
| 2017/0109852 | A1* | 4/2017 | Ito | G06F 21/32 |
| 2017/0244729 | A1* | 8/2017 | Fahrny | G06F 21/54 |
| 2018/0212960 | A1* | 7/2018 | Sandeep | H04L 63/0428 |
| 2019/0155996 | A1* | 5/2019 | Zoldi | G06F 21/105 |
| 2020/0120081 | A1* | 4/2020 | Sutrala | G06F 21/46 |
| 2020/0322155 | A1* | 10/2020 | Cohen | G06F 21/32 |

OTHER PUBLICATIONS

RSA, RSA Netwitness UEBA, Detect Threats Faster, Reduce Dwell Time. Automate Response. Data Sheet, 2018.
RSA, Risk-Based Authentication, Version 11, Jun. 24, 2019, https://community.rsa.com/docs/DOC-77387.
RSA, Identity Assurance Services, 2019, https://www.rsa.com.

* cited by examiner

PRIVACY PRESERVING EVALUATION OF SENSITIVE USER FEATURES FOR ANOMALY DETECTION

FIELD

The field relates generally to information processing techniques, and more particularly, to the processing of user data for anomaly detection.

BACKGROUND

There is an increasing trend towards cloud-based computations, but also an increasing sensitivity for protecting the personal information of users, and especially for protecting personally identifiable information (PII) of users. There are also stricter data privacy regulations, such as the General Data Protection Regulation (GDPR) in the European Union, with additional restrictions placed on organizations to protect the personal data of end-users.

Identity trust engines, for example, require rich contextual data and risk facts to assess and determine the confidence level of a presented identity. A larger amount of contextual data collected and applied to the risk model and a larger amount of historical data available to the trust engine will increase the reliability of the identity confidence determination. However, collecting rich data about user behavior, user actions and the computing environment of a user comes with a cost and the risk of compromising the privacy of a user.

Anonymization is often a technique that is used to preserve user privacy. With anonymization, however, the accuracy and the reliability of the outcome are degraded, as it is infeasible to derive user features from anonymized data.

A need therefore exists for improved techniques for centralized processing of sensitive user data, while also preserving the privacy of a user.

SUMMARY

In one embodiment, a method comprises obtaining, by at least one processing device of a service provider, values of one or more predefined features based at least in part on personal information of a given remote user, wherein the values of the one or more predefined features are computed by at least one processing device of the given remote user; and processing, by the at least one processing device of the service provider, the values of the one or more predefined features based at least in part on personal information to detect one or more predefined anomalies associated with one or more of the given remote user and the at least one processing device of the given remote user, wherein the service provider cannot access the personal information.

In some embodiments, the predefined anomalies associated with one or more of the given remote user and the at least one processing device of the given remote user comprise one or more of a risk anomaly, a security level anomaly, a fraud likelihood anomaly, an identity assurance anomaly, and a behavior anomaly.

In at least one embodiment, the predefined features associated with personal information of the given remote user relate to a location of the given remote user and/or device-specific information for a device of the user.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for centralized processing of sensitive user data.

One or more embodiments of the disclosure provide techniques for privacy preserving centralized evaluation of sensitive user features. In some embodiments, the centralized processing of sensitive user data is performed to detect one or more predefined anomalies, without the service provider having access to any personally identifiable information (PII) or other sensitive information. As used herein, PII comprises any data that could potentially identify a particular individual, or can otherwise be used to distinguish one person from another person.

The predefined anomalies may be associated, for example, with a user and/or a device of the user. The term "user" herein (and variations thereof, such as "given remote user") is intended to be broadly construed so as to encompass numerous arrangements of human, hardware, software or firmware entities, as well as combinations of such entities.

Figure 1:
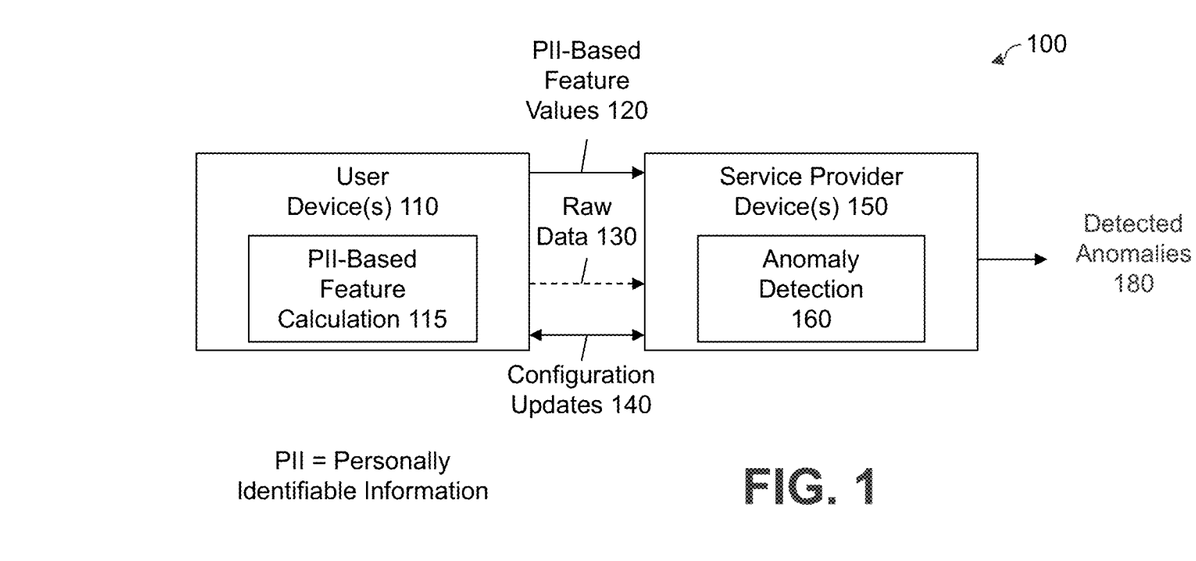
FIG. 1 illustrates an exemplary anomaly detection environment, according to some embodiments of the disclosure.

FIG. 1 illustrates an exemplary anomaly detection environment 100, according to some embodiments of the disclosure. As shown in FIG. 1, the exemplary anomaly detection environment 100 comprises one or more user devices 110 (e.g., a mobile telephone, tablet or a laptop) and one or more service provider devices 150 (for example, in a cloud). In some embodiments, the exemplary user device 110 collects information related to, for example, the user and/or the user device 110, such as predefined contextual data and/or predefined risk facts. In one or more embodiments, the information collected by the user device 110 may be specified by one or more configuration updates 140 from the service provider devices 150.

One or more aspects of the disclosure recognize that some of the information collected by the user devices 110 may comprise PII or other sensitive information of the user. Thus, in order to preserve the privacy of the PII or other sensitive information of the user, in some embodiments, the user devices 110 comprise a PII-based feature calculation module 115 to calculate values of one or more predefined features based on PII of the user, referred to herein as PII-based feature values 120. The user devices 110 provide the computed PII-based feature values 120 to the service provider device 150, as shown in FIG. 1.

As used herein, the term "PII" encompasses PII as well as other sensitive information of the user. For example, the PII may comprise a location of the user or one or more of the user devices 110; and device-specific information for a particular user device 110 (e.g., SIM (Subscriber Identity Module) number, paired bluetooth devices, user external IP (Internet Protocol) addresses, and user movement analysis).

In some embodiments, the user device 110 partially processes the collected data locally, for example, by deriving the one or more PII-based feature values 120 using the PII-based feature calculation module 115. In addition, in one or more embodiments, the user device 110 may also send some raw data 130 to the service provider device 150 that do not comprise PII.

One or more of the service provider devices 150 process the received PII-based feature values 120, using, for example, an anomaly detection module 160, to detect one or more anomalies 180 associated with the user and/or the user device 110, using known machine learning and artificial intelligence techniques. The detected anomalies may comprise, for example, a risk anomaly, a security level anomaly, a fraud likelihood anomaly, an identity assurance anomaly, and a behavior anomaly. For a more detailed discussion of risk-based authentication, see, for example, RSA Security, "Risk-Based Authentication," RSA Document 77387 web page, incorporated by reference herein in its entirety. For a more detailed discussion of identity assurance assessment, see, for example, RSA Security, "Identity Assurance Services, RSA Identity Assurance Practice," RSA Risk and Cybersecurity Practice web page, incorporated by reference herein in its entirety.

In at least some embodiments, the service provider cannot access the underlying PII embedded in the computed PII-based feature values 120. The anomaly detection module 160 may process the received (non-PII) raw data 130, in addition to the received PII-based feature values 120. In at least some embodiments, the anomaly detection module 160 executes a risk model to assess the data received from the user device 110.

As shown in FIG. 1, a communication channel is provided between the user device 110 and the service provider device 150 to communicate one or more configuration updates 140. In this manner, the user device 110 will be able to check if they have the most recent data transformation configuration and download other important data needed for feature calculations (such as lists of suspicious IP addresses), for example, on a periodic basis (e.g., at least once a day). In some embodiments, the service provider devices 150 can push such configuration updates 140 to the user devices 110.

In some embodiments, one or more of the computed PII-based feature values 120 are sent by the user device 110 to the service provider device 150 over an encrypted channel, as would be apparent to a person of ordinary skill in the art.

Upon detection of a predefined anomaly, the service provider devices 150 can optionally initiate or execute one or more predefined remedial steps and/or mitigation steps to address the detected predefined anomalies. For example, the predefined remedial steps and/or mitigation steps to address the detected predefined anomalies may comprise the transmission of an alert or alarm to the user device 110 and/or user for important or suspicious events; isolating, removing, quarantining, limiting permissions, analyzing, and deactivating one or more of the user devices 110 and/or one or more files, accounts or aspects of the user devices 110 or the user; notifying one or more third party systems (such as sending an email, or generating an alert in another system); restricting access of one or more accounts and one or more machines from accessing a network, files or folders; initiating a step-up authentication with one or more additional authentication factors; resetting or limiting permissions associated with a file or folder; quarantining one or more files or folders, and preventing one or more further actions from being executed associated with the user devices 110, user account or machine associated with the detected anomalous activity.

The user devices 110 may comprise, for example, mobile telephones, laptop computers, tablet computers, desktop computers or other types of devices capable of supporting user logins, in any combination. Such devices are examples of what are more generally referred to herein as "processing devices." Some of these processing devices are also generally referred to herein as "computers." The user devices 110 and service provider devices 150 of FIG. 1 can be coupled using a network (not shown), where the network is assumed to represent a sub-network or other related portion of a larger computer network.

Figure 2:
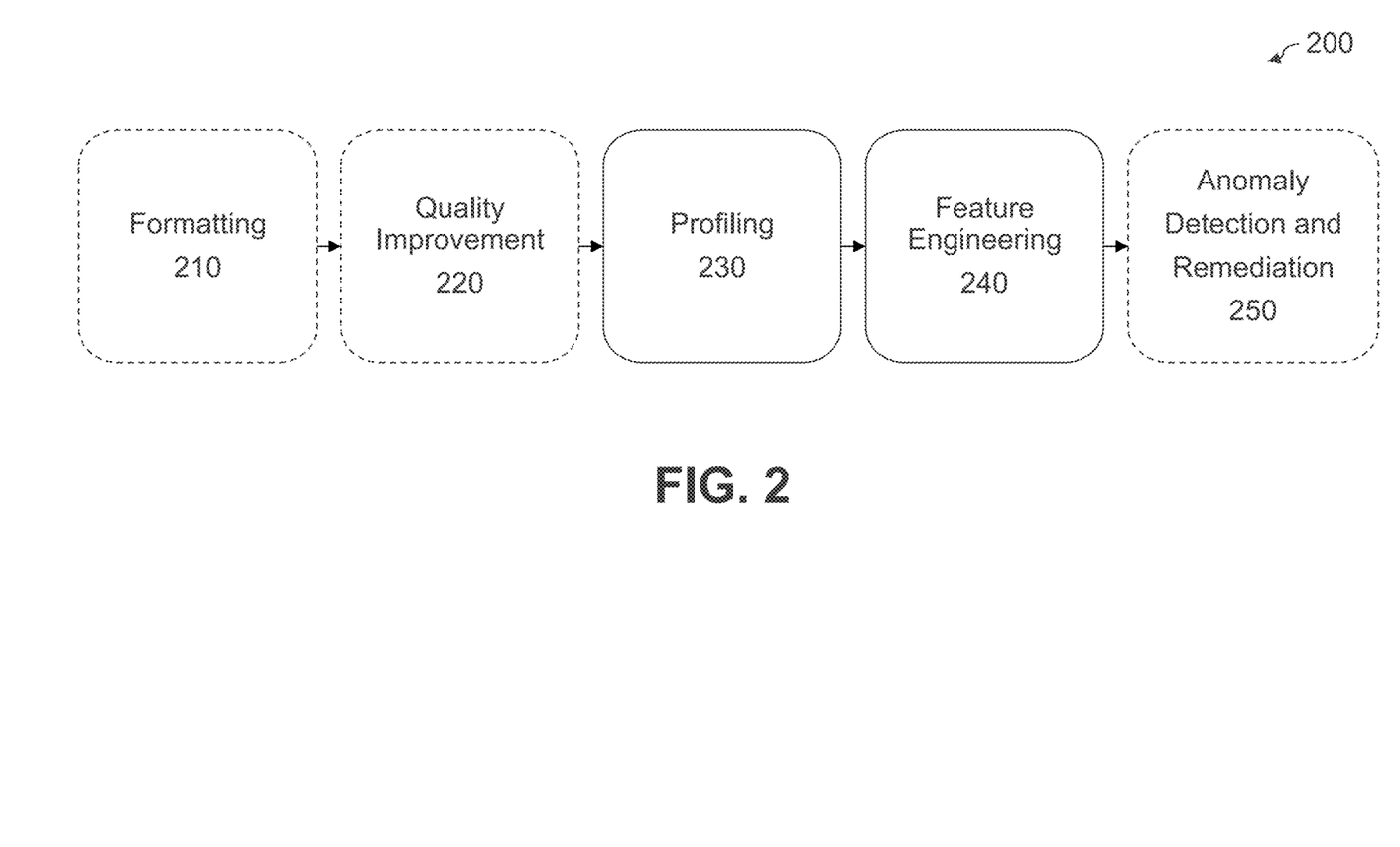
FIG. 2 illustrates a typical machine learning process for anomaly detection, according to some embodiments of the disclosure.

FIG. 2 illustrates a typical machine learning process 200 for anomaly detection, according to some embodiments of the disclosure. The exemplary machine learning process 200 may evaluate, for example, a risk model inside an identity trust engine, according to at least one embodiment. In the example of FIG. 2, the machine learning process 200 comprises a number of phases, such as a formatting phase 210 of collected data; a data quality improvement phase 220; a profiling phase 230; a feature engineering phase 240; and an anomaly detection and remediation phase 250. The anomaly detection and remediation phase 250 is shown with a dashed outline in FIG. 2 to indicate that it may not be present in all implementations.

Existing identity trust servers and other anomaly detection engines execute a risk model with all phases 210 through 240 of the machine learning process 200 of FIG. 2. In particular, the data from a client program executing on a user device 110, often including PII, is sent to the service provider device 150, such as a remote identity trust server, that analyzes the data from the client program for the initial phases 210 through 240 of the machine learning process 200. It is noted that in some implementations the formatting phase 210 and data quality improvement phase 220 are optional. The outcome of each executed step may be logged in a database of the server which, as noted above, may increase the risk of compromising PII or otherwise compromising end-user privacy.

As noted above, in one or more embodiments, the disclosed privacy preserving techniques decouple one or more of the formatting phase 210, data quality improvement phase 220, profiling phase 230 and feature engineering phase 240 from the anomaly detection module 160 in the service provider device 150 (e.g., the identity trust server), for features that contain PII or other personal user data, by computing the PII-based feature values 120 on the user devices 110. In this manner, PII and other private or sensitive user data is not sent to the remote service provider devices 150. This will enable customers and other users to share sanitized sensitive user private information with the anomaly detection module 160 in the service provider devices 150 and maintain the same model accuracy without loss of data or context. Additionally, such solution can be applied for real-time computations (which might be critical for such anomaly detection architectures in some embodiments).

In some embodiments, a data normalization function typically comprises applying relatively simple manipulations techniques on the received raw data, for example, during the formatting phase 210 and/or data quality improvement phase 220. For example, the data normalization function might set default missing values; perform predefined numerical transformations, such as multiplication/division by constant; or perform predefined pre-processing steps, such as calculating the log of the number or encryption/tokenization operations. Such operations can be executed on the user devices 110 without any impact on the quality of the input data.

In one or more embodiments, a data enrichment, feature calculation and discretization function is often considered an important aspect of any machine learning model, as the success of the model prediction/classification is often dependent on the quality of the data and features. In some exemplary implementations, there are a number of data source types applied to the risk model, such as:

user-related information (collected directly or indirectly by the service provider);

information derived from an analysis on an organization level; and threat intelligence.

The user-related information typically comprises sensitive user information and therefore often constitutes a high risk to the privacy of each user. For example, the user location is often considered PII. In a typical flow, user global positioning system (GPS) coordinates, for example, are collected by the user devices 110, and then sent to a central the server, where the coordinates are mapped to corresponding Country and City values.

In some cases, it may be more efficient (detection performance wise) to deal with categorized or discretized features rather than continuous numbers, using the discretization task. For example, a discretized feature may be a feature that represents the number of days that the user has been employed. In many implementations, the employment date is sent to the service provider and the server makes the necessary calculation. As noted above, one or more aspects of the disclosure recognize that such a calculation requires that user private information is shared with the server. Since the goal of such a feature is to identify new employees, a more secure way to implement the computation is to calculate the days since the employee was hired on the user devices 110, check if the number of days is below a specified threshold and notify the service provider device 150 with the New/Old response (or a tokenization of the response).

As mentioned above, one or more embodiments perform such computation on the user devices 110 and share the output of the calculation (the feature) with the service provider devices 150. If needed, in some embodiments, the personal user information can be encrypted or tokenized, for example, to ensure that sensitive information is kept only on the user devices 110 and does not reach the service provider devices 150.

In some cases, the service provider devices 150 will update the user devices 110 with external context, such as threat intelligence, such as a list of suspicious IP addresses, for example, as configuration updates 140. The user devices 110 will make the necessary computation and return the result to the service provider devices 150. For example, the feature that is required for the model indicates whether a suspicious IP address was seen on a user account in the last 10 days. The service provider devices 150 will send a list of all suspicious IP addresses and obtain a True/False response (or the encryption/tokenization of the values). In this manner, the service provider devices 150 will be able to accurately assess the user identity related risk, for example, without having access to the end user IP addresses.

In a similar manner, the information that was retrieved from an organization-level analysis will be processed. For example, a program on the service provider devices 150 often obtains a notification of whether a user is sharing his or her device with other users. In this case, the service provider devices 150 will store a tokenized representation of all devices in the organization (without linking them to a specific user) and calculate whether some device is being shared (for example, by using a HyperLogLog algorithm). Then, the service provider devices 150 will share such information with logic of the PII-based feature calculation module 115 on the user devices 110. The logic will notify the service provider devices 150 of whether the current device is in a shared device list or not.

Figure 3:
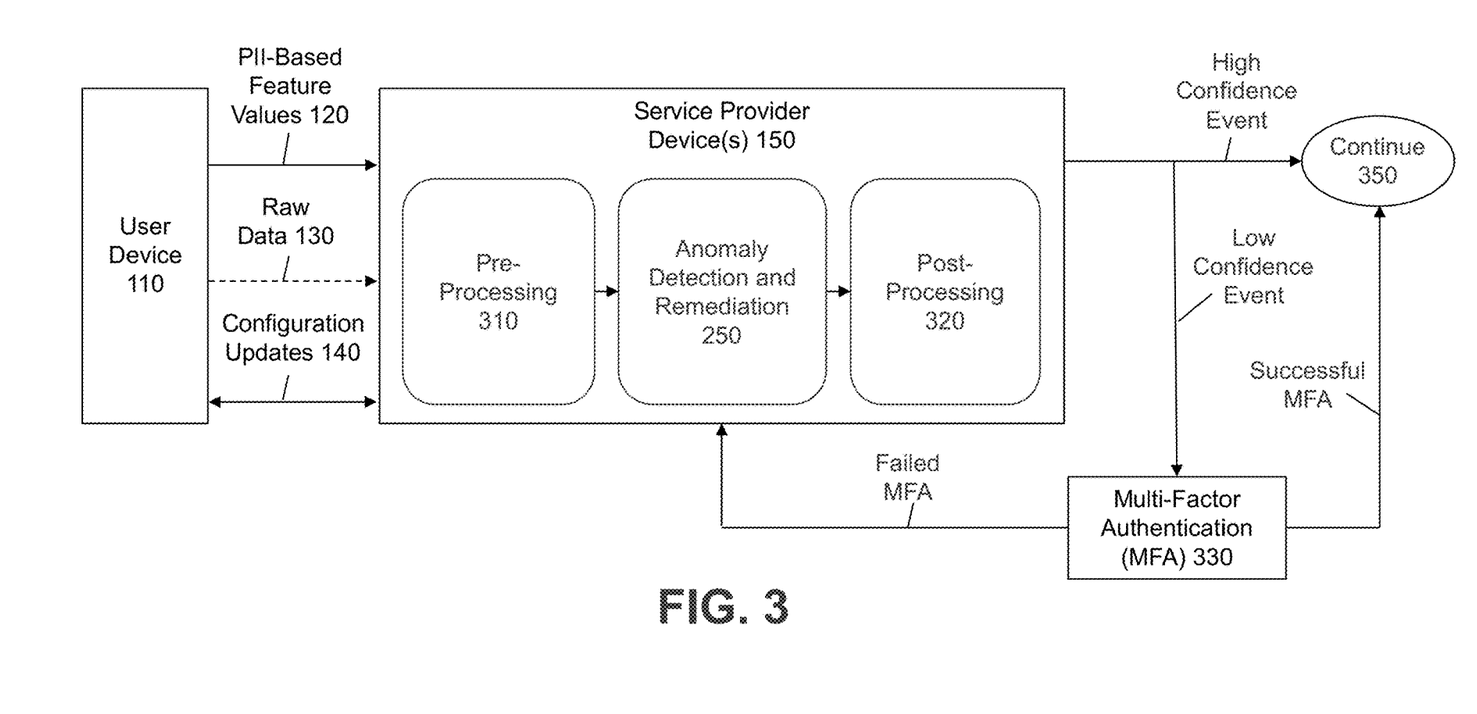
FIG. 3 illustrates an exemplary service provider device of FIG. 1 in further detail, according to an embodiment.

FIG. 3 illustrates an exemplary service provider device 150 of FIG. 1 in further detail, according to an embodiment. As shown in FIG. 3, the exemplary user device 110 collects information related to the user and/or the user device 110. The user devices 110 calculate values of the one or more PII-based feature values 120, and provide the computed PII-based feature values 120 to the service provider device 150. As noted above, in some embodiments, the user device 110 may also send some raw data 130 to the service provider devices 150 that do not comprise PII.

As shown in FIG. 3, a communication channel is provided between the user device 110 and the service provider device 150 to communicate one or more configuration updates 140, as discussed above in conjunction with FIG. 1.

The exemplary service provider devices 150 shown in FIG. 3 comprises a pre-processing module 310 and a post-processing module 320 to perform any needed pre-processing and post-processing, respectively, for the anomaly detection and remediation phase 250, as discussed above in conjunction with FIG. 2.

Consider an exemplary identity assurance implementation, where the anomaly might be a low confidence score for the identity assurance. The exemplary anomaly detection and remediation phase 250 of FIG. 3 determines a confidence score indicating a likelihood that the presented identity is accurate. When the confidence score indicates a high confidence event, the user and/or the user device 110 is allowed to continue at step 350. When the confidence score indicates a high confidence event, however, the user or the user device 110 is required to undergo multi-factor authentication (MFA) 330. If the user fails the MFA, the service provider is notified and takes appropriate remedial action. If the user passes the MFA, the user device 110 is allowed to continue at step 350.

Figure 4:
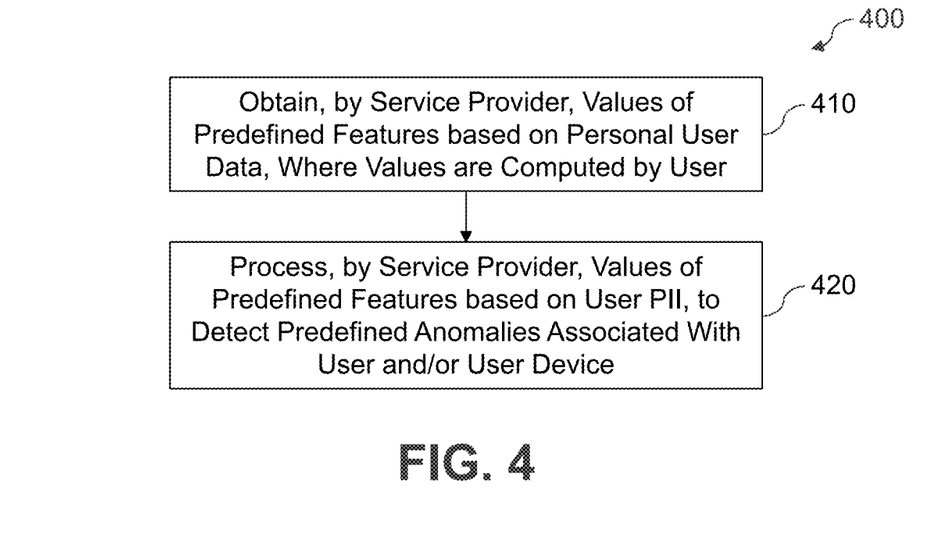
FIG. 4 is a flow chart illustrating an exemplary implementation of a privacy preserving anomaly detection process, according to one embodiment of the disclosure.

FIG. 4 is a flow chart illustrating an exemplary implementation of a privacy preserving anomaly detection process 400, according to one embodiment of the disclosure. As shown in FIG. 4, the service provider device 150 initially obtains values of the predefined features based on personal user data (e.g., PII) during step 410. The values were computed by the user device 110 and sent to the service provider device 150.

Thereafter, the service provider device 150 processes the values of predefined features based on user PII during step 420, to detect one or more predefined anomalies associated with the user and/or one or more of the user devices 110.

Among other benefits, the disclosed techniques for centralized processing of sensitive user data reduce the risk of compromising end-user privacy by storing anonymized information about end-user features at the server, often without reducing the accuracy of the anomaly detection performance. Moreover, the disclosed techniques enable organizations to enrich the analysis (and therefore improve the engine performance) with either user or organization proprietary data in a way does not expose the data to the service provider devices 150.

In some embodiments, the disclosed techniques for privacy preserving centralized evaluation of sensitive user features maintain the privacy of PII and do not provide the service provider devices 150 with access to the predefined PII.

One or more embodiments of the disclosure provide improved methods, apparatus and computer program products for privacy preserving centralized evaluation of sensitive user features. The foregoing applications and associated embodiments should be considered as illustrative only, and numerous other embodiments can be configured using the techniques disclosed herein, in a wide variety of different applications.

It should also be understood that the disclosed privacy preserving feature computation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for privacy preserving centralized evaluation of sensitive user features may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based privacy preserving feature computation engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based privacy preserving feature computation platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
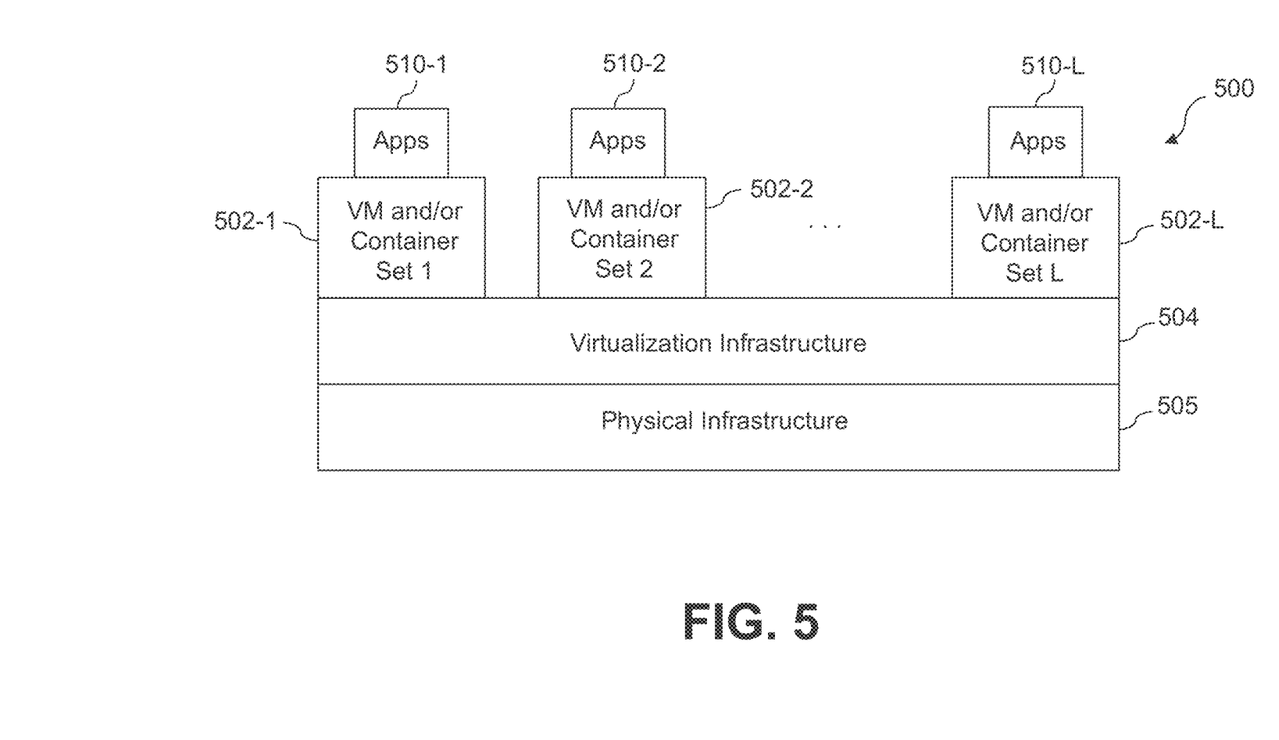
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide privacy preserving feature computation functionality of the type described above for one or more processes running on a given one of the VMs. For example, each of the VMs can implement privacy preserving feature computation control logic and associated client-side computation of PII-based features for providing privacy preserving feature computation functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide privacy preserving feature computation functionality of the type described above for one or more processes running on different ones of the containers. For example, a container host device supporting multiple containers of one or more container sets can implement one or more instances of privacy preserving feature computation control logic and associated client-side computation of PII-based features for providing privacy preserving feature computation functionality.

As is apparent from the above, one or more of the processing modules or other components of anomaly detection environment 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
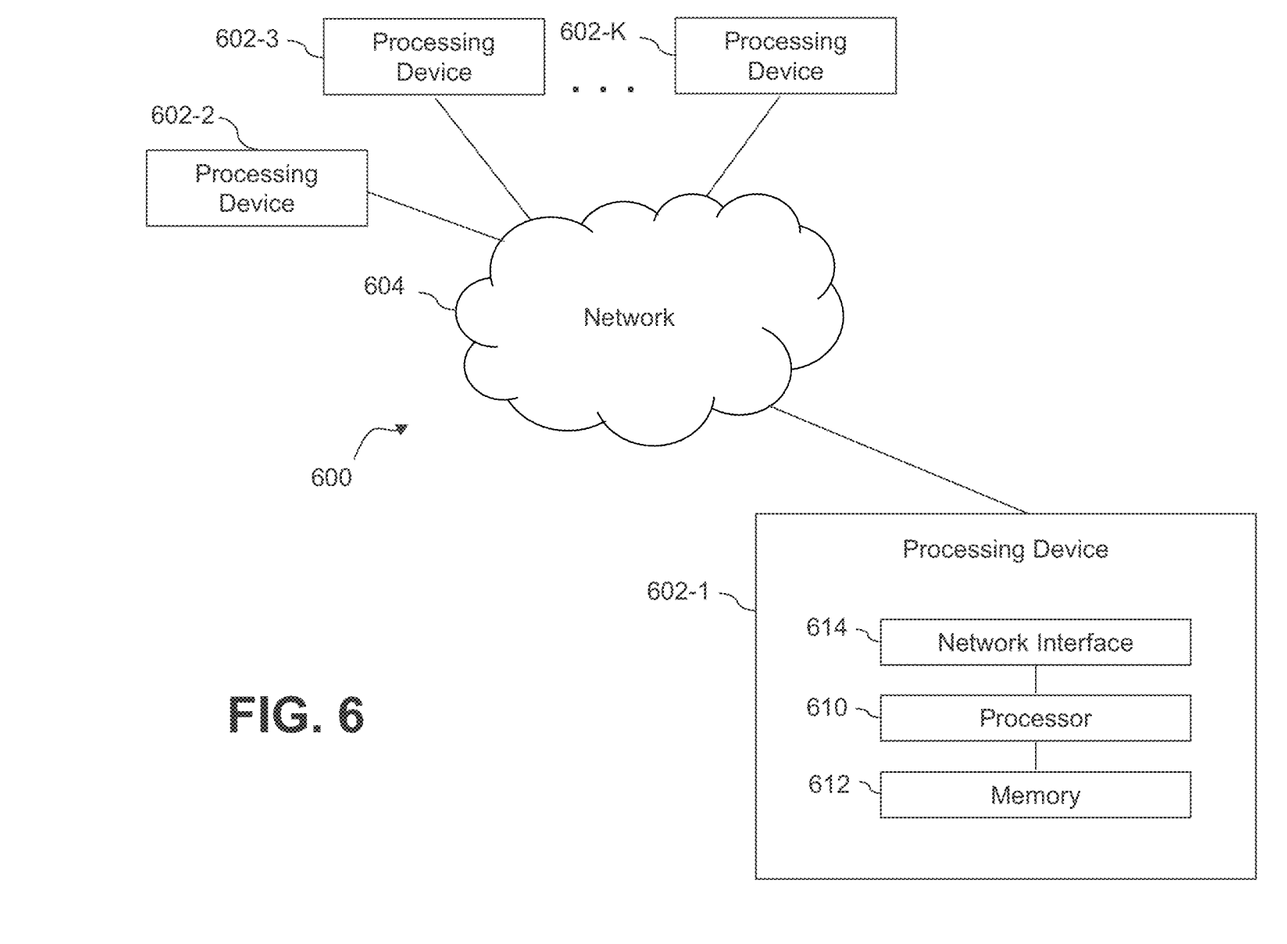
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by at least one processing device of a service provider, values of one or more predefined features based at least in part on personal information of a given remote user, wherein the values of the one or more predefined features are computed by at least one processing device of the given remote user, wherein at least one of the values of the predefined features is categorized into a discrete category of a plurality of discrete categories, by the at least one processing device of the given remote user, prior to providing the values of the one or more predefined features to the service provider, such that the service provider cannot access the personal information of the given remote user associated with the at least one value of the one or more predefined features, wherein the categorization of the at least one value of the one or more predefined features by the at least one processing device of the given remote user is based at least in part on an evaluation of dynamic contextual data by the at least one processing device of the given remote user, wherein the dynamic contextual data is used for the categorization of the at least one value of the one or more predefined features and is provided to the at least one processing device of the given remote user by the at least one processing device of the service provider; and processing, by the at least one processing device of the service provider, the values of the one or more predefined features based at least in part on personal information to detect one or more predefined anomalies associated with one or more of the given remote user and the at least one processing device of the given remote user.

2. The method of claim 1, wherein the one or more predefined anomalies associated with one or more of the given remote user and the at least one processing device of the given remote user comprise one or more of a risk anomaly, a security level anomaly, a fraud likelihood anomaly, an identity assurance anomaly, and a behavior anomaly.

3. The method of claim 1, wherein the at least one processing device of the service provider communicates with the at least one processing device associated with the given remote user to provide an updated data transformation configuration needed for calculation of the values of the one or more predefined features.

4. The method of claim 1, wherein the at least one processing device associated with the given remote user performs a data normalization comprising one or more of setting one or more missing values, performing one or more predefined numerical transformations and performing one or more predefined pre-processing operations.

5. The method of claim 1, wherein the at least one processing device associated with the given remote user performs a data enrichment to improve a quality of one or more of user data and the one or more predefined features.

6. The method of claim 1, wherein the one or more predefined features based at least in part on the personal information of the given remote user relate to one or more of a location of the given remote user and device-specific information for a device of the user.

7. The method of claim 1, wherein the obtaining comprises the at least one processing device of the given remote user sending the values of the one or more predefined features based at least in part on personal information to the service provider over an encrypted channel.

8. The method of claim 1, wherein the at least one processing device of the service provider computes one or more additional features not associated with personal information of the given remote user.

9. The method of claim 1, wherein the at least one processing device of the service provider initiates one or more of predefined remedial steps and predefined mitigation steps to address the detected predefined anomalies.

10. An apparatus comprising:

at least one processing device comprising a processor coupled to a memory;

the at least one processing device corresponding to a service provider and being configured to perform the following steps:

obtaining, by at least one processing device of a service provider, values of one or more predefined features based at least in part on personal information of a given remote user, wherein the values of the one or more predefined features are computed by at least one processing device of the given remote user, wherein at least one of the values of the predefined features is categorized into a discrete category of a plurality of discrete categories, by the at least one processing device of the given remote user, prior to providing the values of the one or more predefined features to the service provider, such that the service provider cannot access the personal information of the given remote user associated with the at least one value of the one or more predefined features, wherein the categorization of the at least one value of the one or more predefined features by the at least one processing device of the given remote user is based at least in part on an evaluation of dynamic contextual data by the at least one processing device of the given remote user, wherein the dynamic contextual data is used for the categorization of the at least one value of the one or more predefined features and is provided to the at least one processing device of the given remote user by the at least one processing device of the service provider; and processing, by the at least one processing device of the service provider, the values of the one or more predefined features based at least in part on personal information to detect one or more predefined anomalies associated with one or more of the given remote user and the at least one processing device of the given remote user.

11. The apparatus of claim 10, wherein the one or more predefined anomalies associated with one or more of the given remote user and the at least one processing device of the given remote user comprise one or more of a risk anomaly, a security level anomaly, a fraud likelihood anomaly, an identity assurance anomaly, and a behavior anomaly.

12. The apparatus of claim 10, wherein the at least one processing device of the service provider communicates with the at least one processing device associated with the given remote user to provide an updated data transformation configuration needed for calculation of the values of the one or more predefined features.

13. The apparatus of claim 10, wherein the one or more predefined features based at least in part on the personal information of the given remote user relate to one or more of a location of the given remote user and device-specific information for a device of the user.

14. The apparatus of claim 10, wherein the obtaining comprises the at least one processing device of the given remote user sending the values of the one or more predefined features based at least in part on personal information to the service provider over an encrypted channel.

15. The apparatus of claim 10, wherein the at least one processing device of the service provider initiates one or more of predefined remedial steps and predefined mitigation steps to address the detected predefined anomalies.

16. A non-transitory processor-readable storage medium having stored therein program code of one or more software programs, wherein the program code when executed by at least one processing device of a service provider causes the at least one processing device of the service provider to perform the following steps:

obtaining, by at least one processing device of a service provider, values of one or more predefined features based at least in part on personal information of a given remote user, wherein the values of the one or more predefined features are computed by at least one processing device of the given remote user, wherein at least one of the values of the predefined features is categorized into a discrete category of a plurality of discrete categories, by the at least one processing device of the given remote user, prior to providing the values of the one or more predefined features to the service provider, such that the service provider cannot access the personal information of the given remote user associated with the at least one value of the one or more predefined features, wherein the categorization of the at least one value of the one or more predefined features by the at least one processing device of the given remote user is based at least in part on an evaluation of dynamic contextual data by the at least one processing device of the given remote user, wherein the dynamic contextual data is used for the categorization of the at least one value of the one or more predefined features and is provided to the at least one processing device of the given remote user by the at least one processing device of the service provider; and processing, by the at least one processing device of the service provider, the values of the one or more predefined features based at least in part on personal information to detect one or more predefined anomalies associated with one or more of the given remote user and the at least one processing device of the given remote user.

17. The non-transitory processor-readable storage medium of claim 16, wherein the one or more predefined anomalies associated with one or more of the given remote user and the at least one processing device of the given remote user comprise one or more of a risk anomaly, a security level anomaly, a fraud likelihood anomaly, an identity assurance anomaly, and a behavior anomaly.

18. The non-transitory processor-readable storage medium of claim 16, wherein the at least one processing device of the service provider communicates with the at least one processing device associated with the given remote user to provide an updated data transformation configuration needed for calculation of the values of the one or more predefined features.

19. The non-transitory processor-readable storage medium of claim 16, wherein the one or more predefined features based at least in part on the personal information of the given remote user relate to one or more of a location of the given remote user and device-specific information for a device of the user.

20. The non-transitory processor-readable storage medium of claim 16, wherein the obtaining comprises the at least one processing device of the given remote user sending the values of the one or more predefined features based at least in part on personal information to the service provider over an encrypted channel.

* * * * *